L. DAFT.
COUPLING.
APPLICATION FILED MAY 19, 1914.

1,229,417.

Patented June 12, 1917.

Witnesses:
M. MacIntyre.
Wm. M. Earl

Inventor
Leo Daft
By his Attorneys

UNITED STATES PATENT OFFICE.

LEO DAFT, OF RUTHERFORD, NEW JERSEY, ASSIGNOR TO ELECTRO-CHEMICAL RUBBER AND MANUFACTURING COMPANY, A CORPORATION OF NEW JERSEY.

COUPLING.

1,229,417.               Specification of Letters Patent.       Patented June 12, 1917.

Application filed May 19, 1914. Serial No. 839,485.

*To all whom it may concern:*

Be it known that I, LEO DAFT, a subject of the King of Great Britain, and a resident of Rutherford, in the county of Bergen and State of New Jersey, have invented a new and useful Coupling, of which the following is a specification.

My invention relates to a coupling for coupling together the adjacent ends of two shafts which are in substantial alinement.

The object of my invention is to provide a coupling of the kind referred to, which will be simple and inexpensive in construction and which will be capable of yielding sufficiently to compensate for violent fluctuations in load by permitting of a considerable angular displacement and for any inaccuracy in the alinement of the shafts or other defect.

I accomplish this result by making the coupling of two disks of metal or other rigid material, and a disk of rubber or other yieldable material interposed between and connected to the rigid disks. The rigid disks are adapted to be secured to the adjacent ends of the shafts which are to be coupled together. If the adjacent faces of the rigid disks were plane surfaces, and the side faces of the yielding disk likewise plane surfaces, the application of power from the driving shaft to the driven shaft, through the coupling, would exert a shear on the yieldable disk which would soon break it down. I have overcome this difficulty by making the contacting faces of all of the disks irregular, preferably wave-like or undulatory surfaces which radiate from the center of the disks and whose form approximates a sine curve at the mean radius of any disk. In this way, the shearing stresses in the yieldable disk are practically eliminated, or in other words converted into compression stresses which the yieldable material can withstand indefinitely.

Figure 1:
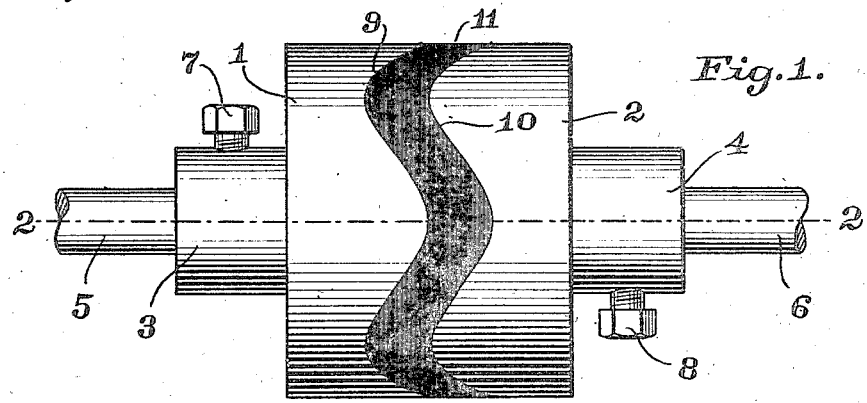
Figure 2:
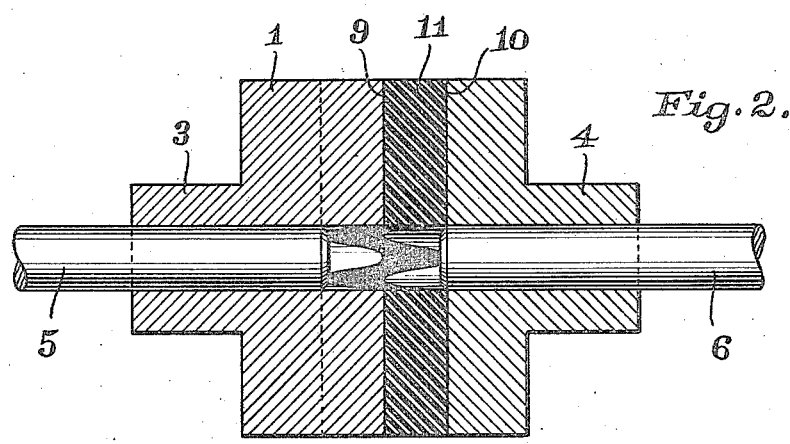
Figure 3:
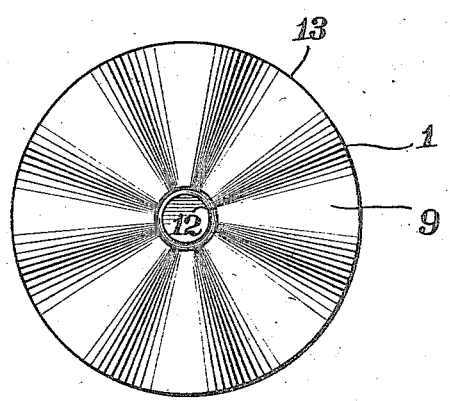

Referring to the drawing: Figure 1 is an elevation of my device; Fig. 2 is a sectional view taken on the line 2—2 of Fig. 1; and Fig. 3 is an end elevation of one of the metallic disks before the parts have been assembled.

The disks 1, 2, of metal or other rigid material are provided with hubs 3, 4, in which the shafts 5, 6, are secured by the set screws 7, 8, or other suitable means. The disks 1, 2, are identical and the adjacent faces 9, 10, thereof, instead of being plane surfaces, are irregular, preferably wave-like surfaces, as clearly shown in the drawing. Between the adjacent faces of the disks 1, 2, is interposed a disk 11 of rubber or other yieldable material, the side faces of which are irregular or wave like, to correspond to the adjacent faces of the disks 1, 2. It is preferable to secure these three disks together by vulcanizing the rubber disk to the metal disks, or in any other suitable manner. As an example of methods which may be employed for connecting the metal and rubber disks together, see for instance, Patents Nos. 1,036,576, and 1,057,334. I do not limit myself to these or any particular methods, however.

I do not wish to limit myself to any particular form of irregular surface for the disks. I have discovered, however, that the shearing stresses will be entirely eliminated or converted into compression stress if the irregular surfaces are wave-like and of such form that the curve at the mean radius between the extreme radii 12, 13, of disk 1 is substantially a sine curve. In the embodiment herein shown the curve comprises four complete sine waves.

It is thus apparent that I have invented a coupling which includes a yieldable member which will compensate for violent fluctuations in load by permitting of a considerable relative angular displacement of the disks and for any irregularities in the alinement of the connected shafts, and which is so constructed that the transmission of power from the driving shaft to the driven shaft produces no shear, but only compression in the yieldable member. In this way all of the disadvantages of using a yieldable material, such as rubber, in a transmission member, are obviated.

What I claim is:

1. A coupling comprising two disks of rigid material having wave-like lateral faces adapted to be secured respectively to the two shafts to be coupled together, and a disk of yieldable material having wave-like lateral faces interposed between the said first mentioned disks so that the contacting wave-like lateral faces are in contact substantially throughout, the wave-like faces being so constructed that only compressive stress is exerted on said disk of yieldable material by the transmission of power from one of said shafts to the other.

2. A coupling comprising two disks adapted to be secured respectively to the two shafts which are to be coupled together, and a yieldable disk interposed between and contacting with the adjacent lateral faces of said first-mentioned disks, the contacting lateral faces of all of said disks being wave-like surfaces.

3. A coupling comprising two disks of rigid material adapted to be secured respectively to the two shafts to be coupled together, and a disk of yieldable material interposed between and connected to the adjacent faces of said first mentioned disks, the connecting faces of all of said disks being wave like surfaces.

4. A coupling comprising two disks of rigid material adapted to be secured respectively to the two shafts to be coupled together and a disk of yieldable material interposed between and connected to the adjacent lateral faces of said first mentioned disks, the connecting lateral faces of all of said disks being wave-like surfaces.

5. A coupling comprising two metallic disks adapted to be secured respectively to the two shafts which are to be coupled together, and a rubber disk interposed between and connected to the adjacent faces of said metallic disks, the connecting faces of all of said disks being wave like surfaces.

6. A coupling comprising two metallic disks adapted to be secured respectively to the two shafts which are to be coupled together, and a rubber disk interposed between and vulcanized to the adjacent faces of said metallic disks, the connecting faces of all of said disks being wave like surfaces.

7. A coupling comprising two members adapted to be secured respectively to the two shafts which are to be coupled together, and a yieldable member interposed between and connected to the adjacent faces of said first mentioned members, the connecting faces of all of said members being irregular surfaces.

8. A coupling comprising two disks of rigid material adapted to be secured respectively to the two shafts to be coupled together, and a disk of yieldable material interposed between and connected to the adjacent faces of said first mentioned disks, the connecting faces of all of said disks being irregular surfaces.

9. A coupling comprising two metallic disks adapted to be secured respectively to the two shafts which are to be coupled together; and a rubber disk interposed between and connected to the adjacent faces of said metallic disks, the connecting faces of all of said disks being irregular surfaces.

10. A coupling comprising two metallic disks adapted to be secured respectively to the two shafts which are to be coupled together, and a rubber disk interposed between and vulcanized to the adjacent faces of said metallic disks, the connecting faces of all of said disks being irregular surfaces.

11. A coupling comprising two disks of rigid material, and a disk of yieldable material interposed therebetween and vulcanized thereto.

12. A coupling comprising two disks adapted to be secured respectively to the two shafts which are to be coupled together and a yieldable disk interposed between and contacting with adjacent lateral faces of said first mentioned disks, the contacting lateral faces of all of said disks being in the form of waves radiating from the center and being substantially sinular at the mean radius.

In testimony whereof I have hereunto signed my name in the presence of two witnesses.

LEO DAFT.

Witnesses:
WALTER S. JONES,
WM. M. EARL.